006E# United States Patent Office 3,005,993
Patented Oct. 31, 1961

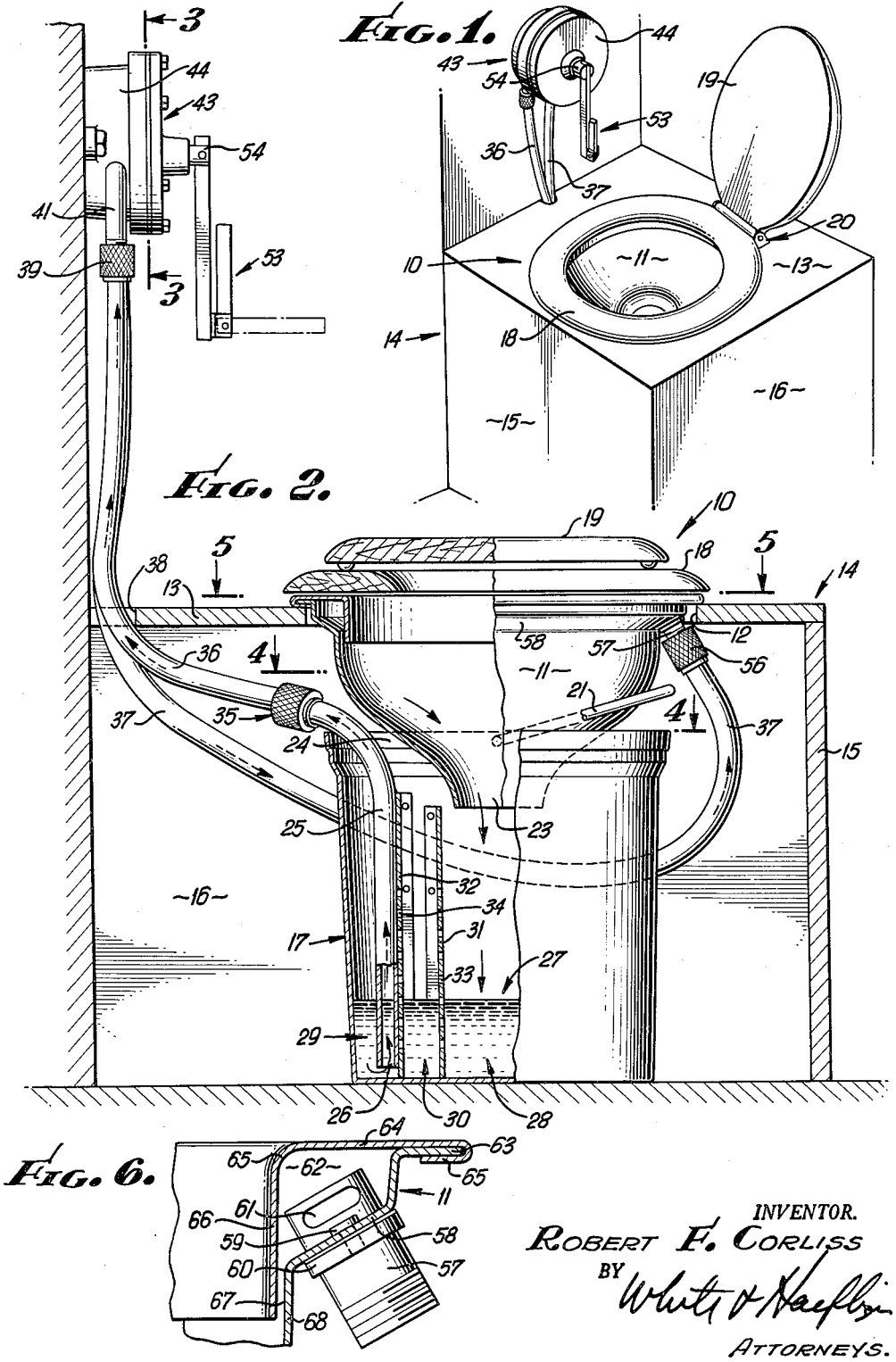

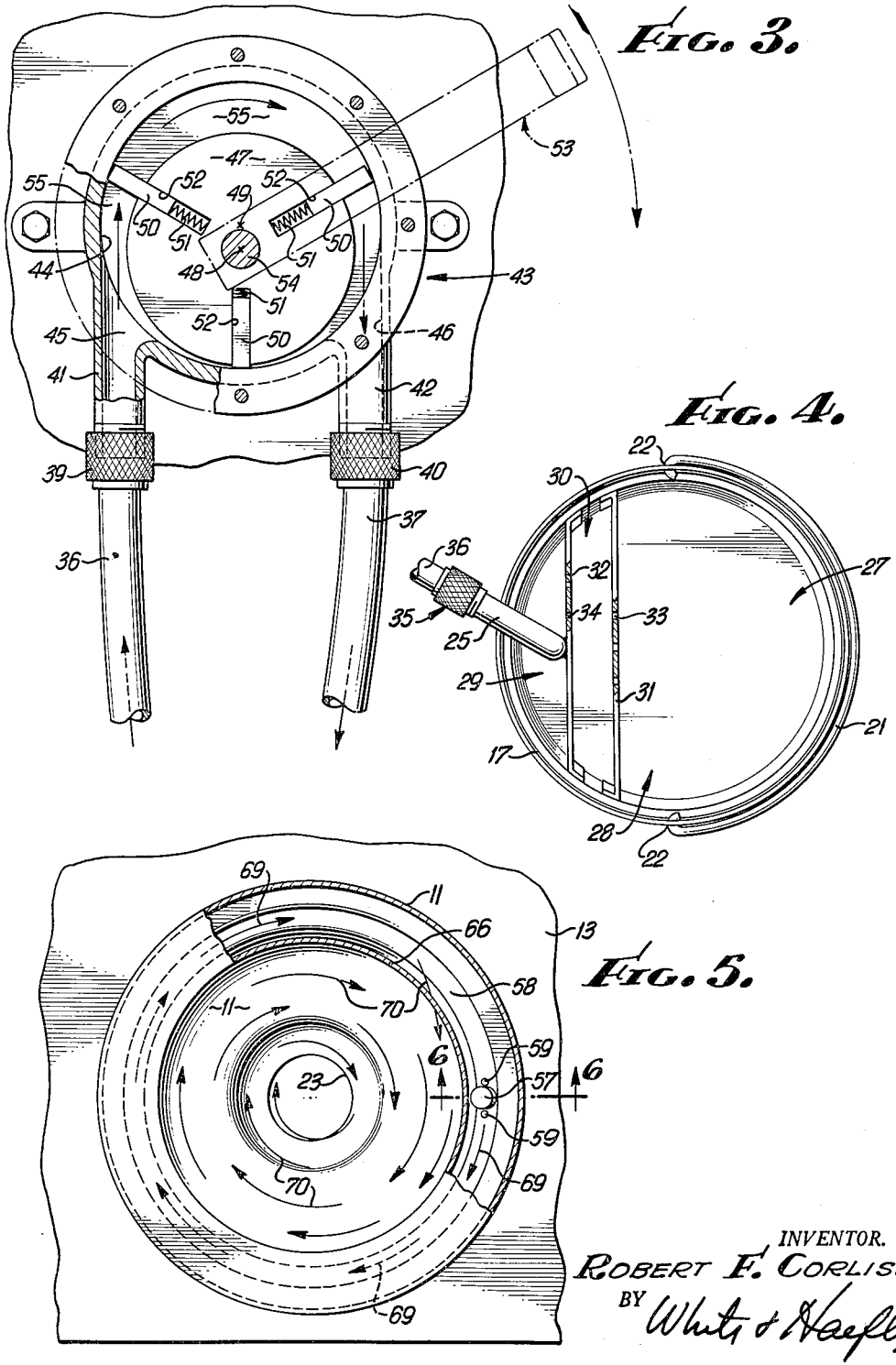

3,005,993
PORTABLE FLUSHING TOILET
Robert F. Corliss, 3160 E. Orange Grove Ave.,
Pasadena, Calif.
Filed July 18, 1960, Ser. No. 43,365
8 Claims. (Cl. 4—115)

This invention relates generally to the design and construction of toilets, and more particularly concerns an improved portable toilet which has highly advantageous use in trailers, boats and the like.

The invention is directed to the problem of mechanically and chemically processing sewage under conditions where the water supply is extremely limited. For example, conventional marine type toilets use up to seven gallons of water per person per day, and it is clear that a fresh water supply necessary to provide for this usage requires a rather large storage tank; however, the provision of such tanks takes up valuable space on boats, and on trailers, so that these become impractical. As a result, many hundreds of boats, trailers and cabins are without any toilet facilities, or the facilities provided are unsatisfactory and require very frequent cleaning or servicing, which is objectionable.

It is a major object of the present invention to provide a simple and unique solution to the above discussed problem, the invention contemplating the separation and recirculation of liquids including disinfecting and deodorizing agents to accomplish toilet flushing. As will appear, the invention broadly comprises means including a toilet bowl and a sewage receptacle or sump underlying the bowl and adapted to hold sewage treatment liquid. The bowl is movable from over the receptacle to permit upward removal and withdrawal of the receptacle for periodic emptying, this being necessary at only infrequent intervals since it has been found that about one-half gallon of water and a few ounces of good disinfectant-deodorizer, such as commercially known Chlorosan or West disinfectant, keep the system inoffensive for weeks at a time. Also contemplated by the invention, is the provision of bowl flushing means including a manually operated pump and suction and discharge conduits connected therewith, the suction conduit having an inlet in the sewage receptacle and the discharge conduit being in discharge communication with the interior of the bowl, whereby upon manual pumping operation a stream of treatment liquid is withdrawn from the receptacle and circulated onto the interior surface of the bowl for flushing gravity return flow to the receptacle through the bowl outlet.

More particularly, the separation and recirculation of liquids is enabled through the provision of filter means in the sewage receptacle or sump through which all treatment liquid reaching the pump conduit inlet is necessarily drawn. Accordingly, the recirculated liquids are not only disinfected and deodorized in the receptacle, but are also segregated from the solids, this function acting in aid of the flushing action whereby the entire bowl area is bathed with the recirculated liquids including the disinfectant-deodorant. This operation kills harmful bacteria and prevents odors from forming.

Another important feature of the invention is directed to the complete enclosing of the sewage receptacle, as within a cabinet structure, provision being made for ready removal and servicing of the receptacle after movement of the cabinet supported bowl from over the receptacle. For this purpose, the suction and discharge conduits are equipped with quick release couplings, and preferably are flexible to permit adjustment and initial lifting of the receptacle or sump from the cabinet, as required. Also, the flexible conduits facilitate ease of installation of the portable toilet in different trailer and boat environments, with the manually operated pump conveniently mounted upon any close-by panel structure.

These and other objects and advantages of the invention, as well as the details of an illustrative embodiment, will be more fully understood from the following detailed description of the drawings, in which:

FIG. 1 is a perspective showing of the installed toilet and the pump;
FIG. 2 is an enlarged cross sectional elevation through the toilet, partly broken away to show interior details of construction;
FIG. 3 is an enlarged section taken through the pump, on line 3—3 of FIG. 2;
FIG. 4 is a horizontal section taken on line 4—4 of FIG. 2;
FIG. 5 is a section taken on line 5—5 of FIG. 2; and
FIG. 6 is an enlarged section taken on line 6—6 of FIG. 5.

In FIGS. 1 and 2, the portable toilet is generally indicated at 10 as including a bowl structure 11 received downwardly within an aperture 12 formed in the top horizontal panel 13 of a cabinet structure 14. The latter includes front and side walls 15 and 16 within which a sewage receptacle 17 is concealed. The bowl structure 11, toilet seat 18 and cover 19 are hinge-connected at 20 to the top panel 13 of the cabinet, whereby these elements may be separately and individually pivoted upwardly and away from the top panel 13. As will appear, this upward displacement of the bowl structure 11 permits upward withdrawal and removal of the sewage receptacle 17 from the cabinet 14 for periodic emptying. For this purpose a bale 21 or handle is connected to the receptacle shell at diametrically opposite locations 22, the bale normally being swung sidewardly to the position shown in FIG. 4 during usage of the receptacle.

It will be seen in FIG. 2 that the bowl structure tapers downwardly toward a discharge outlet 23 which is normally received downwardly into the upper interior of the receptacle 17. The upper end of the latter is open and there is substantial clearance at 24 between the receptacle and the bowl structure to provide for free passage of air to and from the receptacle, as well as for the insertion of a pipe 25 which projects downwardly into the receptacle. The lower end of the suction pipe 25 is open at 26 to form an inlet through which treatment liquid is drawn for recirculation to the bowl.

Such liquid is generally indicated at 27 as standing within the lower interior of the receptacle 17, and in three zones side by side, 28, 29 and 30. The first zone 28 is formed between a first upright filter plate 31 and a portion of the receptacle wall, the second zone 29 is likewise formed between a second upright filter plate 32 and another portion of the receptacle wall, and the third zone 30 is formed between the two spaced apart plates 31 and 32. As is indicated, the two plates extend chordwise across the lower interior of the receptacle and between curved interior sides thereof. As illustrated in FIGS. 2 and 4, zone 28 is the larger of the three zones, it serving to receive and confine the solids, segregating them from liquid passing in succession from zone 28 to zone 30 and then to zone 29, for suction into the pipe 25. Filter plate 31 has perforations 33 which typically are about one-quarter inch in diameter, whereas the perforations 34 in plate 32 are quite small as for example one-sixteenth inch in diameter, for fine filtering action. Accordingly, the two plates form therebetween an intermediate filtering zone, and a double filtering action is achieved to insure against clogging or other malfunction of the filters, which would prevent ready passage of treatment liquid to the suction pipe.

Intake pipe 25 extends upwardly to the exterior of the receptacle 17 and is connected by means of a quickly releasable coupling 35 to a flexible hose 36. A second flexible hose 37, together with hose 36, pass together upwardly through an opening 38 in the panel 13, these two hoses being connected by quick release couplings 39 and 40 with the threaded suction and discharge fittings 41 and 42 of a pump 43 installed generally above the elevation of the bowl structure 11.

Referring to FIG. 3, the pump generally comprises a chamber 44 having suction and discharge ports 45 and 46 formed by the fittings 41 and 42 respectively. Chamber 44 is circular, and contains a rotor block 47, the axis 48 of which is positioned eccentrically with respect to the chamber axis 49. The rotor block is equipped with vanes 50 urged outwardly by springs 51 in vane slots 52 toward the chamber cylindrical walls as illustrated. Accordingly, when the rotor block 47 is rotated by the hand crank 53 which projects outside the housing 44 and which is connected to the rotor block shaft 54, the sewage treatment liquid is drawn through the intake conduits 25 and 36 into the increasing size arcuate spaces 55 between the vanes 50. Thereafter, the liquid in the spaces 55 is pumped under pressure from the decreasing size spaces 55 through the outlet port 46 of the pump and through the flexible discharge hose 37, under pressure.

Referring back to FIG. 2 it will be seen that the lower end of hose 37 is joined to a releasable coupling 56 which is in turn threaded onto the nozzle body 57. The latter is attached to and projects through a frusto-conical wall portion 58 of the bowl structure 11, the connection being secured by a fastener 59 projecting through the wall portion 58 and into a flange 60 of the nozzle body. The body 57 has a jetting outlet 61 which opens sidewardly in the direction of elongated annular extent of a channel 62 formed by the bowl structure. The latter has an annular tab 63 to which is secured a flange cover 64 as by bending a portion 65 of the flange cover over the tab 63. The flange cover 64 furthermore extends horizontally inwardly toward the interior of the bowl and then is bent downwardly at 65 to form a partition 66 acting with the remainder of the bowl structure 58, 64 and 65 to form the annular channel 62. Furthermore the partition 66 is spaced inwardly slightly at 67 from the bowl wall 68 seen in FIG. 6 so that the channel 62 opens downwardly adjacent the periphery of the bowl upper extent. Accordingly, flushing liquid which is jetted from the opening 61 is confined to flow around the channel 62 in the direction of the arrows 69, and gravitates downwardly in a vortex flow path through the opening or space 67 and over the exposed inner surface of the bowl as indicated by the arrows 70 in FIG. 5. Thus, the entire bowl interior surface area is bathed with disinfectant-deodorant treating liquid during flushing, for killing bacteria and odor. All of the liquid thus jetted into the bowl passes downwardly through the central discharge opening 23 into the receptacle 17 for recirculation after filtering.

From the foregoing it will be seen that an extremely simple and efficient toilet is provided. It has been found capable of serving two people for six days without requiring emptying of the receptacle, and if longer service is required, it is only necessary to disconnect hose couplings 35 and 56 after lifting the bowl structure 11, and the receptacle 17 may then be lifted through the aperture 12 for emptying, rinsing, and recharging of the receptacle with treatment liquid. The latter never comes in contact with the toilet seat 18 since it is confined in the channel 62 below the seat 18 during flushing. Furthermore, the advantages of the portable toilet include lack of need for a sewer connection or for electric power to accommodate the flushing action.

I claim:

1. The combination, comprising a cabinet structure including a substantially horizontally extending upper panel forming an enlarged aperture, means including a bowl structure downwardly received in said aperture and seated on the top surface of said panel about said aperture and a sewage receptacle underlying the bowl structure within said cabinet and adapted to hold a pool of sewage treatment liquid, the bowl structure being upwardly removable away from said receptacle to permit upward withdrawal and removal of the receptacle from said cabinet for periodic emptying, said bowl structure forming a channel extending at least part way about the upper interior of the bowl for confining flushing liquid to flow thereabout at approximately the level of said panel, said channel opening downwardly to discharge flushing liquid in a vortex flow path over the exposed inner surface of the bowl, said bowl having a downwardly opening sewage outlet within the upper interior of said sewage receptacle, bowl flushing means including a pump and suction and discharge conduits connected therewith, the suction conduit having an inlet in said receptacle and the discharge conduit having a jetting outlet in direct communication with said channel to discharge liquid therealong, whereby upon pump operation a stream of treatment liquid is withdrawn from the receptacle and circulated as flushing liquid onto the interior surface of the bowl for gravity return flow to the receptacle through the bowl outlet, and filtering means in said receptacle through which all treatment liquid reaching said suction conduit inlet is necessarily drawn, and releasable couplings in said conduits concealed within the cabinet structure below said upper panel and exposable upon upward removal of said bowl structure.

2. The invention as defined in claim 1 in which said discharge conduit includes a nozzle body carried by said bowl and forming said jetting outlet which opens in the directon of said channel extent, said discharge conduit including a flexible line and a releasable coupling interconnecting said line with said nozzle body.

3. The invention as defined in claim 1 in which said bowl structure includes a peripheral flange projecting horizontally and outwardly about the uppermost extent of the bowl for seating engagement with bowl support structure, the area enclosed by said flange in a horizontal plane being greater than the upwardly projected horizontal cross sectional area of said receptacle.

4. The invention as defined in claim 3 including a toilet seat overlying said flange and channel and hinge means interconnecting said seat and bowl structure to accommodate upward swinging movement of the seat away from the bowl structure.

5. The invention as defined in claim 1 in which said pump includes a chamber having suction and discharge ports, a vane equipped rotor in the chamber and a hand crank connected to the rotor and projecting from the housing for turning said rotor.

6. The invention as defined in claim 1 in which said pump is mounted at a higher elevation than said bowl structure and said suction and discharge lines extend upwardly toward the pump through said panel at one side of said bowl structure.

7. The invention as defined in claim 6 in which said filtering means includes first and second plates containing coarse and fine perforations respectively.

8. The invention as defined in claim 7 in which said plates extend within the lower interior of the receptacle, the first plate forming with the receptacle a solids confinement zone for receiving sewage discharge from said bowl, the second plate forming with the receptacle a filtered liquid zone containing said suction conduit inlet, and the two plates forming therebetween a filtering zone intermediate said solids confinement zone and said filtered liquid zone.

References Cited in the file of this patent

FOREIGN PATENTS

| 471,281 | Great Britain | Sept. 1, 1937 |
| 626,441 | Great Britain | July 14, 1949 |